Dec. 19, 1961           E. L. DECK           3,013,448
CHAIN SAW SHARPENER
Filed Aug. 25, 1960           2 Sheets-Sheet 1
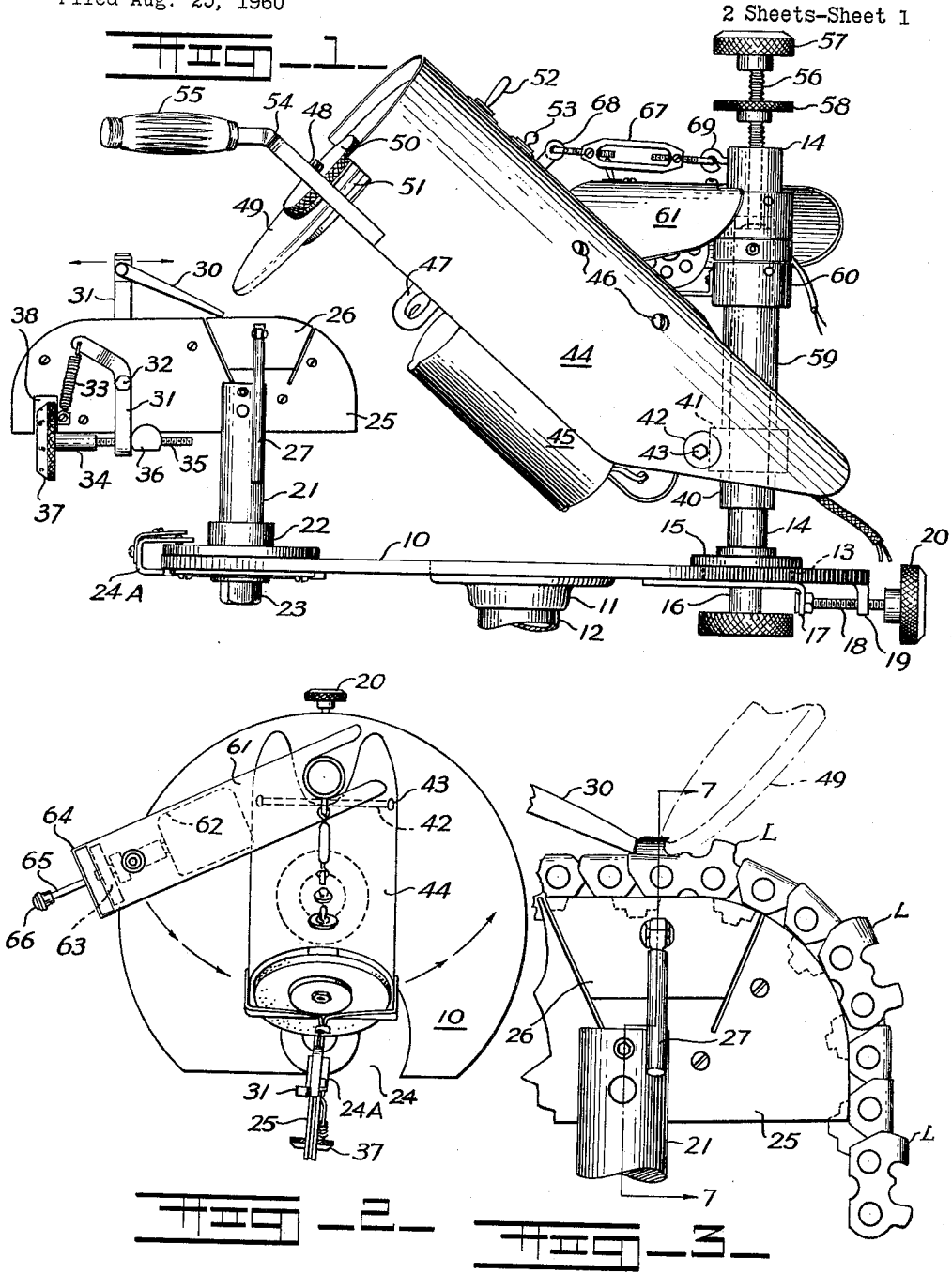
INVENTOR.
Earl L. Deck
BY
W.B.Hargman
ATTORNEY.

Dec. 19, 1961
E. L. DECK
3,013,448
CHAIN SAW SHARPENER
Filed Aug. 25, 1960
2 Sheets-Sheet 2
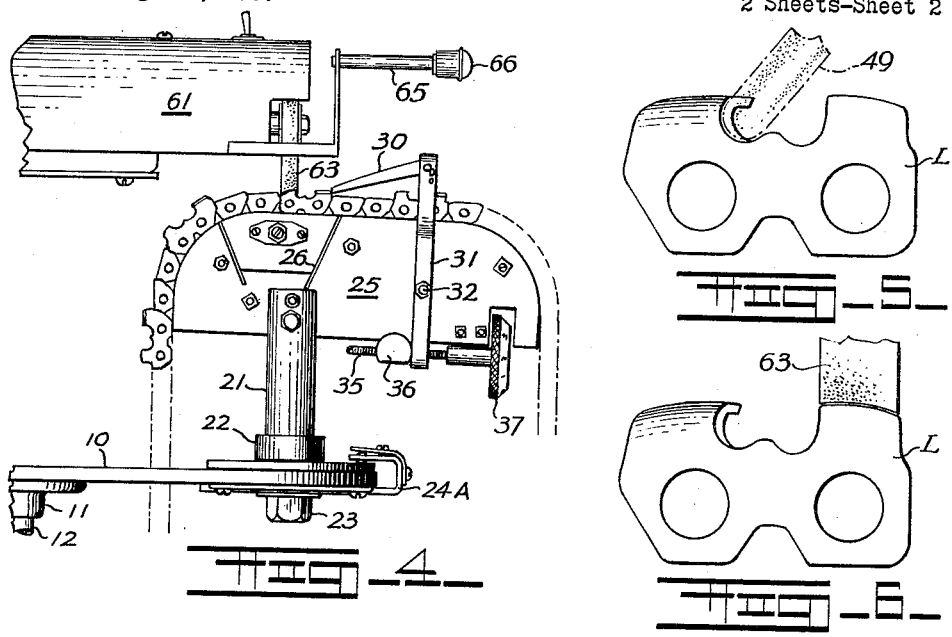
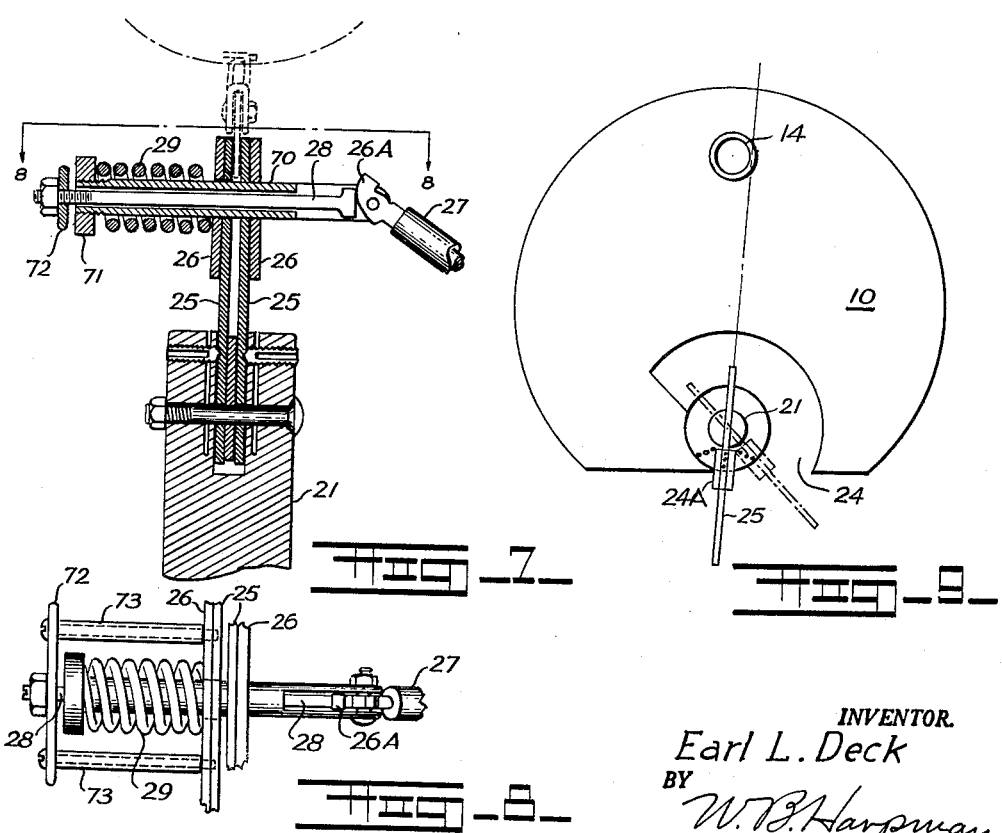
INVENTOR.
Earl L. Deck
BY
W. B. Harpman
ATTORNEY.

ns
Patented Dec. 19, 1961

3,013,448
CHAIN SAW SHARPENER
Earl L. Deck, 1220 Park St., Findlay, Ohio
Filed Aug. 25, 1960, Ser. No. 51,929
5 Claims. (Cl. 76—40)

This invention relates to a power-driven sharpener for a chain saw.

The principal object of the invention is the provision of a motor-driven chain saw sharpener adapted for use in sharpening the teeth of an endless saw chain used in a chain saw.

A further object of the invention is the provision of a chain saw sharpener which includes a direct drive reversible grinding wheel arranged to pass through a notched saw tooth of the saw chain.

A still further object of the invention is the provision of a chain saw sharpener that is simple in construction, easy to operate and will perform a perfect sharpening operation on each link of the saw chain used in a chain saw.

A still further object of the invention is the provision of a saw chain sharpener wherein the saw tooth grinding mechanism includes two units both of which are pivotally mounted relative to the saw chain being sharpened so that they can be moved into and out of registry with the teeth in the saw chain and used to sharpen the same quickly and efficiently.

A still further object of the invention is the provision of a saw chain sharpener having means for adjustably mounting a saw chain relative to the sharpening wheels and means for adjusting the position of the saw chain so as to position the same for speedy and accurate sharpening.

Still another object of the invention is to provide a saw chain sharpener which is designed for ease and economy in manufacture and convenience and simplicity in use.

Still another object of the invention is to provide a practical, reliable and durable chain saw sharpener which will be exceedingly effective for the purpose for which it is designed.

The chain saw sharpeners heretofore known in the art have required a considerable amount of mechanical ingenuity in their operation in that they provided unsatisfactory means for locating and adjusting the links of the chain to be sharpened with respect to the sharpening or grinding wheels and relied upon the operator's skill in moving the parts of the apparatus to effectively engage and sharpen the links of the saw chain.

The present invention provides means for mounting the saw chain to be sharpened and means for adjustably positioning both the mounting and the saw chain upon the mounting means so that the possibility of human error is almost completely eliminated. Furthermore, the present device incorporates a pair of motors driving a pair of grinding wheels and these motors and grinding wheels are so arranged on a common pivotal mounting that they can be alternately swung into position for registry with the same link of the saw chain being sharpened so that the different angles of the grinding wheels may be alternately employed without the heretofore believed necessary practice of completely altering the position of one grinding wheel. Additionally, the chain sharpener disclosed herein provides quick and easy indexing of the chain mounting means so that various desired angles can be accomplished during the sharpening operation and the alternately angled teeth on the chain sharpened as they progressively advance into sharpening position without changing all of the sharpener or its position relative to the saw chain.

With the foregoing and other objects in view which will appear as the description proceeds, the invention resides in the combination and arrangement of parts and in the details of construction hereinafter described and claimed, it being the intention to cover all changes and modifications of the example of the invention herein chosen for purposes of the disclosure, which do not constitute departures from the spirit and scope of the invention.

The invention is illustrated in the accompanying drawing, wherein:

FIGURE 1 is a side view of the chain saw sharpener with portions thereof broken away.

FIGURE 2 is a top plan view of the chain saw sharpener on a reduced scale as compared with FIGURE 1.

FIGURE 3 is an enlarged detailed view of a portion of the device shown in FIGURE 1.

FIGURE 4 is a detailed view of a portion of the device shown in FIGURE 1 showing the alternate sharpening wheel and motor in engagement with the saw chain thereon.

FIGURE 5 is a detail of one of the saw chain links with dotted lines indicating the position of one of the sharpening wheels.

FIGURE 6 is a detail of another of the saw chain links with broken lines showing the position of one of the sharpening wheels thereon.

FIGURE 7 is a vertical section on line 7—7 of FIGURE 3 through the saw chain mounting means.

FIGURE 8 is a top plan view on line 8—8 of FIGURE 7.

FIGURE 9 is a top plan view of a portion of the device showing the indexing means in conjunction with the saw chain mounting means.

By referring to the drawings, and FIGURE 1 in particular, it will be seen that a chain saw sharpener has been disclosed which includes a main body member 10 which is horizontally disposed and substantially flat and provided with a socket 11 on its central lowermost surface for the reception of a tubular stand 12, a portion of which is disclosed in FIGURE 1. The tubular stand 12 in the complete device supports the body member 10 in elevated relation to a supporting surface such as the floor.

The body member 10 has a slot 13 therein adjacent one side thereof and a vertically disposed post 14 is positioned through the slot 13 and held in vertical position relative to the horizontal body member 10 by a flange 15 and a clamping nut 16 engaging the bottom threaded end of the post 14. A bifurcated bracket 17 is positioned between the nut 16 and the body member 10 and secured to the nut 16 and is adapted to be moved horizontally by a threaded shaft 18 passing through an apertured bracket 19. The bracket 19 is mounted on the body member 10. A knurled adjustment nut 20 is secured to the outer end of the threaded shaft 18 so that rotating motion imparted thereto will move the post 14 back and forth in the slot 13 and relative to the body member 10.

On the body member 10 and in oppositely disposed relation to the post 14 there is a secondary post 21 which is positioned vertically through another opening in the body member 10 by means of a secondary flange 22 and nut 23 positioned therebelow and engaging the secondary post 21.

By referring to FIGURE 2 of the drawings, it will be observed that there is an arcuate rather wide cut-away area formed in the body member 10 and extending partially around the secondary flange 22 and the secondary post 21. The cut-away area 24 permits a saw chain being sharpened to be moved into desired position for the sharpening operation hereinafter described.

The secondary flange 22 and the secondary post 21 are rotatably mounted on the body member 10 and they are held in predetermined indexed relation thereto by a U-shaped clamping member 24A one end of which is secured to the body member 10 and the other end of which has a friction point engaged in accurately positioned and spaced depressions formed in the upper face of the secondary flange 22 so that the secondary post 21 when rotated may be retained in desired position. The upper end of the secondary post 21 is slotted vertically and a vertical saw chain carrying member is positioned thereon. The saw chain carrying member is formed of a pair of spaced plates 25, 25 as best seen in FIGURE 7 of the drawings which plates 25, 25 have portions 26, 26 thereof partly separated therefrom and movable transversely thereof and controlled by a cam urged clamp incorporating a cam and lever 27, a clamping rod 28 and a coil spring 29. As best illustrated in FIGURE 7 of the drawings, the cam urged clamp operates to hold the saw chain being sharpened in predetermined fixed relation on the top of the saw chain carrying member on the secondary post 21.

In FIGURE 4 of the drawings, a saw chain will be seen in position on the saw chain carrying member and a partial view of a similar saw chain positioned on the device may be seen in FIGURE 3 of the drawings. Those familiar with saw chains will observe that there are depending portions centrally aligned on the saw chain which may be positioned in a longitudinally extending groove and the plates 25, 25 forming the saw chain carrying body provide such a groove therebetween and thereby efficiently position the saw chain for sharpening while the portions 26, 26 thereof hold the chain in position with one link and one tooth thereof in position for sharpening.

Means for moving and for positioning the saw chain relative to the saw chain carrying member is provided and comprises an arm 30 pivoted to the upper end of a saw chain lever 31 which is U-shaped and positioned in partially enclosing relation on the saw chain carrying member and pivoted thereby by a bolt 32. The one arm of the saw chain lever 31 is straight and is pivotally connected to the arm 30 while the other one is curved and has its curved end attached to one end of a coil spring 33. The other end of the coil spring 33 is attached to the saw chain carrier member. A threaded bracket 34 is positioned below the saw chain carrying member and secured thereto and a threaded shaft 35 is positioned therethrough and extends through the lowermost looped portion of the saw chain lever 31 heretofore described and is provided with an abutment 36 which is in engagement with the saw chain lever arm 31. A wheel 37 is secured to one end of the threaded shaft 35 and held against other than rotary motion by being positioned in a notch 38 in the plates 25, 25. The wheel 37 is indexed so that it may be rotated and the indexing used to indicate the relative position of the arm 30 which is moved thereby and the end of which is engaged on the link of the saw chain being sharpened as best seen in FIGURE 3 of the drawings.

It will thus be seen that the saw chain to be sharpened is positioned on the saw chain carrier member, moved into desired position by rotation of the wheel 37 and clamped in such position by clamping action of the portions 26, 26 of the saw chain carrying member, as occasioned by the coil spring 29 when the cam and lever 27 is moved to free the clamping rod 28 and permits the coil spring 29 to expand.

By referring now to the post 14 on the body member 10, it will be observed that a collar 40 is positioned on the post 14 in a rotatable manner and has a sidewardly extending portion 41 which receives a transversely positioned structural member 42 which extends outwardly on either side of the collar 40 and is secured by bolts 43 to the opposite sides of an inverted U-shaped housing 44. The housing 44 has an electric motor 45 mounted therein by bolts 46 passing therethrough. An electric light bulb 47 is located beneath the housing 44 and forwardly of the electric motor 45 and below the drive shaft 48 thereof. The drive shaft 48 extends parallel with the housing 44 and it is partially enclosed thereby and is adapted to receive a grinding wheel 49 on its threaded outermost end between a pair of threaded plates, 50 and 51 respectively, which are engaged on the drive shaft 48.

The electric motor 45 is of the reversible type and a switch 52 in the housing 44 with its manually operable control extending outwardly therefrom as best seen in FIGURE 1 is provided so that the direction of the rotation of the electric motor 45 may be controlled thereby. A secondary switch 53 controls the current to the electric light bulb 47. A bifurcated handle 54 is attached to the sides of the housing 44 and extends forwardly thereof and has a centrally positioned, forwardly extending, angular portion which carries a suitable hand grip 55. The hand grip 55 and the bifurcated handle 54 permit the ready manual manipulation of the housing 44 and its contents in a pivotal motion on the post 14 and thereby moves the grinding wheel 49 relative to the saw chain on the saw chain carrier member as heretofore described.

The collar 40 on the post 14 is vertically movable thereon as well as rotatably positioned and vertical movement is occasioned by rotation of a threaded shaft 56 having a knurled wheel 57 on its upper end and passing through a secondary knurled disc 58 which in turn engages the upper end of the post 14. Rotation of the threaded shaft 56 in one direction elevates the collar 40 and the housing 44 with its motor 45 and grinding wheel 49 while rotation of the wheel 57 in the opposite direction causes the reverse action; that is, the lowering of the housing 44. The collar 40 has a tubular extension vertically thereof indicated by the numeral 59 and a secondary collar 60 on the upper end thereof which is movable exactly like the collar 40 directly supports a secondary housing 61. The secondary housing 61 carries a secondary motor 62 which has a secondary grinding wheel 63 thereon, the forward end of the secondary housing 61 is provided with a bifurcated handle 64 having a common forwardly extending section 65 which receives a secondary hand grip 66. Thus, the secondary housing 61, the secondary motor 62 and the secondary grinding wheel 63 may be conveniently moved relative to the post 14 on which they are pivotally secured. A turn buckle 67 is positioned between a pair of eyelets 68 and 69 which are affixed to the housing 44 and the upper end of the post 14 respectively and that portion thereof which is revolvable, and thereby provides for the angular adjustment of the housing 44 relative to the vertical post 14. Thus, the exact angular positioning of the secondary grinding wheel 49 may be controlled by adjustment of the vertical positioning of the collar 40 on the post 14 and the angular positioning of the housing 44 and the grinding wheel 49 relative thereto by the turn buckle 67.

It will thus occur to those skilled in the art that the grinding wheel 49 may be preset for proper registry with a particular type of saw chain tooth by the proper positioning of the post 14, the proper elevation of the collar 40 thereon and the proper angle of the housing 14, etc. relative thereto. Thus, all of the teeth of a saw chain may be sharpened without resetting any of these adjustments, thereby contributing to the efficiency of the device.

Those skilled in the art will understand that a preferable operating procedure would be to position the saw chain on the saw chain carrier member, adjust the same relative thereto as hereinbefore explained, and then clamp the same in position with a tooth to be sharpened beneath the grinding wheel 49. A 35 degree cut, for example, is then made on each tooth on one side of the chain by merely repositioning the chain relative to the chain carrier member and swinging the grinding wheel through the proper area of the tooth as shown in FIGURES 3 and 5 of the drawings. When this operation is performed the electric motor would, for example, be running clockwise. The second stage of the sharpening would be to reverse the electric motors directions of rotation so that it runs counterclockwise and the operation is repeated on the left-hand teeth on the saw chain. To finish the sharpening, the secondary housing 61, with its secondary motor 62, and secondary grinding wheel 63 is swung into position as shown in top plan view in FIGURE 2 of the drawings and the secondary grinding wheel 63 will be in straight vertical alignment and the tops of the riders of the chain saw links which can then be sharpened as seen in FIGURE 4 of the drawings.

It will be observed that the secondary grinding wheel 63 has a slight radius thereon to conform with the desired shape of the rider portion of the saw chain link.

By referring again to the clamping portions 26, 26 of the saw chain carrier member, it will be seen that the same comprises separated vertical extending portions of the plates 25, 25 and that a tube 70 is secured to the portion 26 on the righthand side thereof as seen in FIGURE 7 of the drawings and that it extends freely through openings in the other section 26. A nut 71 is threaded on its outermost end and the cam 28 is positioned through the tube 70 and secured to a yoke 72 which includes spaced horizontally disposed portions 73, 73 which in turn are secured to the portion 26 on the left side thereof as shown in FIGURE 7. Thus, movement of the cam and lever 27 will move the yoke 72 in one direction relative to the tube 70 and thereby move the two clamping portions 26, 26 apart or permit them to be moved together by the spring 29. Thus, the clamping action necessary to hold each chain saw link in position for sharpening is provided.

By referring to FIGURE 5 of the drawings, one of the chain saw links "L" as used in a typical chain saw may be seen, and it will be observed that a dotted line representation of the grinding wheel 49 is shown positioned down in the cutaway portion of the link "L" sharpening the cutting edge of the same. In FIGURE 6, a view of the same link "L" is shown with the secondary grinding wheel 63 in position sharpening the rider or trailing portion of the link.

Those skilled in the art will understand that the grinding wheels and their particular configuration and positioning will be changed when various types of saw chains having different contoured links are sharpened. In each instance, however, the two grinding wheels, one of which is reversible as hereinbefore described, permit the ready indexing of the same with the links and the rapid sharpening of the links without repeatedly adjusting the grinding wheels for individual registry with individual links being sharpened. The novelty in this disclosure therefore resides in the arrangement of the sharpener which adjustably and movably positions the grinding wheels for alternate operation on a saw chain while at the same time providing for the adjustment and movement of the saw chain as is necessary in initially positioning it and then subsequently advancing it as each link is sharpened.

It will thus be seen that the saw chain sharpener disclosed herein meets the several objects of the invention, and having thus disclosed my invention, what I claim is:

1. A chain saw sharpener including a body member having support means therefore, a saw chain carrier positioned at one side of said body member and a post positioned at the other side, a housing and motor mount pivotally positioned on said post in vertically adjustable relation thereto, a first grinding wheel carried on said motor, a secondary housing and motor positioned on said post in vertical adjustable relation thereto and rotatably thereon, a secondary grinding wheel on said secondary motor, said grinding wheels being spaced by said housings relative to said post and independently movable on a common arcuate path relative to said post transversely of said saw chain carrier member, and means on said saw chain carrier for clamping said saw chain thereto with a link thereof to be sharpened positioned in said arcuate path of said grinding wheels.

2. The chain saw sharpener set forth in claim 1 and wherein said post is adjustably mounted on said body member for movement toward and away from said saw chain carrier member and wherein said first-mentioned housing and motor and grinding wheel are disposed at an angle from horizontal and positioned on said angle on said post for movement on said arcuate path.

3. The chain saw sharpener set forth in claim 1 and wherein said saw chain carrier member comprises a secondary post rotatably mounted on said body member, a pair of spaced plates forming the chain receiving portion of said saw chain carrier member secured to the upper end of said post, oppositely disposed clamping portions of said plates being movable relative to the remainder of said plates and cam actuated spring means for clamping said saw chain between said clamping portions of said plates.

4. The chain saw sharpener set forth in claim 1 and wherein a sleeve is rotatably mounted on said post, a collar is mounted on said sleeve, and wherein said first mentioned housing is pivotally mounted on said collar, a secondary collar rotatably mounted on said sleeve in spaced relation to said first-mentioned collar and wherein said secondary housing is pivotally mounted on said secondary collar.

5. The chain saw sharpener set forth in claim 1 and wherein said saw chain carrier member comprises a secondary post rotatably mounted on said body member adjacent a cut-out area therein, a pair of vertically positioned horizontally spaced plates forming a chain receiving portion of said saw chain carrier member secured to the upper end of said post, oppositely disposed sections of said plates forming clamping portions arranged for movement relative to one another and to said plates and cam actuated spring urged means for clamping said saw chain between said clamping portions, a saw chain lever pivoted to said plates, an arm pivoted to said saw chain lever, a threaded bracket on said plates, a threaded shaft in said bracket and having an abutment on one end thereof engaged against said saw chain lever and a wheel on said threaded shaft and partially positioned in a notch in said plates for moving said saw chain lever and said arm, said arm arranged to engage a link of the said saw chain positioned between said clamping portions of said carrier member.

References Cited in the file of this patent
UNITED STATES PATENTS

| 2,318,456 | Blum | May 4, 1943 |
| 2,792,724 | Durall | May 21, 1957 |

FOREIGN PATENTS

| 8,091 | Great Britain | Sept. 7, 1911 |